United States Patent
Outlaw et al.

(10) Patent No.: US 11,011,928 B2
(45) Date of Patent: May 18, 2021

(54) BUS TRANSFER FOR A FLIGHT TEST SYSTEM

(71) Applicant: THE BOEING COMPANY, Chicago, IL (US)

(72) Inventors: Daniel Coe Outlaw, Kent, WA (US); Lijun Gao, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 221 days.

(21) Appl. No.: 16/215,323

(22) Filed: Dec. 10, 2018

(65) Prior Publication Data

US 2020/0185959 A1 Jun. 11, 2020

(51) Int. Cl.
*H02J 9/06* (2006.01)
*B64D 41/00* (2006.01)
*H02M 5/458* (2006.01)
*H02M 7/537* (2006.01)
*H02J 4/00* (2006.01)

(52) U.S. Cl.
CPC .............. *H02J 9/062* (2013.01); *B64D 41/00* (2013.01); *H02J 4/00* (2013.01); *H02M 5/458* (2013.01); *H02M 7/537* (2013.01); *B64D 2221/00* (2013.01)

(58) Field of Classification Search
None
See application file for complete search history.

(56) References Cited

U.S. PATENT DOCUMENTS

| 4,044,268 | A | 8/1977 | Hammel et al. |
| 6,137,706 | A | 10/2000 | Nesbitt et al. |
| 6,876,103 | B2 | 4/2005 | Radusewicz et al. |
| 10,103,538 | B1 * | 10/2018 | Xiong ....................... H02H 3/20 |
| 2006/0043797 | A1 * | 3/2006 | Hjort ....................... H02J 7/0047 307/46 |
| 2015/0338894 | A1 * | 11/2015 | Cohen ....................... H02J 9/062 713/310 |

* cited by examiner

*Primary Examiner* — Jared Fureman
*Assistant Examiner* — Joel Barnett
(74) *Attorney, Agent, or Firm* — Moore IP Law

(57) ABSTRACT

A power conditioning unit includes unit a rectifier having an input terminal coupled to a power transfer unit output terminal and a regulator having an input terminal coupled to an output terminal of the rectifier. The power conditioning unit also includes an energy buffer coupled to an output terminal of the regulator. The power conditioning unit includes an inverter having an input terminal coupled to the energy buffer and having an output terminal configured to couple to a load.

20 Claims, 10 Drawing Sheets

BUS TRANSFER FOR A FLIGHT TEST SYSTEM

FIELD OF THE DISCLOSURE

The present disclosure is related to powering a flight test system.

BACKGROUND

Aircraft flight testing is performed to ensure that an aircraft meets design specifications and certification standards. During flight testing, flight test monitoring equipment can be added to the aircraft in order to gather flight test data. Generally, the flight test monitoring equipment is powered by a power bus of the aircraft under test. During some flight test operations, the power bus can be deactivated (e.g., intentionally as part of a test procedure), or power levels provided by the power bus can fluctuate. Such power disruptions can lead to loss of flight test data.

SUMMARY

According to one implementation of the present disclosure, a power control system includes a power transfer unit and a power conditioning unit. The power transfer unit includes a plurality of power terminals and one or more switches coupled to a power transfer unit output terminal. Each power terminal of the plurality of power terminals is configured to couple to a respective alternating current power bus of a plurality of alternating current power busses or couple to a direct current bus of a plurality of direct current power busses. The one or more switches are configured to selectively couple the power transfer unit output terminal to a selected one of the plurality of power terminals. The power conditioning unit includes a rectifier having an input terminal coupled to the power transfer unit output terminal and a regulator having an input terminal coupled to an output terminal of the rectifier. The power conditioning unit also includes an energy buffer coupled to an output terminal of the regulator and an inverter having an input terminal coupled to the energy buffer and having an output terminal configured to couple to a load. The power control system also includes a controller coupled to the power transfer unit via one or more switch control lines and coupled to the power conditioning unit via one or more regulator control lines.

According to another implementation of the present disclosure, a power control system includes a power transfer unit configured to receive power via a current signal from a primary power bus. The primary power bus is associated with one of a plurality of alternating current power busses or a plurality of direct current power busses of an aircraft. The power control system also includes a conditioning unit coupled to the power transfer unit and configured to receive the current signal from the power transfer unit. The conditioning unit is also configured to rectify the current signal to generate a rectified signal in response to the current signal corresponding to an alternating current signal from one of the plurality of alternating current power busses or bypass rectification operations in response to the current signal corresponding to a direct current signal from one of the plurality of direct current busses. The conditioning unit is also configured to store energy of the rectified signal or energy of the direct current signal at an energy buffer of the conditioning unit. The conditioning unit is also configured to generate a conditioned alternating current signal based on the rectified signal or the direct current signal. The conditioning unit is further configured to output the conditioned alternating current signal to an output terminal that is configured to be coupled to a load of a flight test system. The power control system also includes a controller configured to receive measurement data for each alternating current power bus of the plurality of alternating current power busses and measurement data for each direct current power bus of the plurality of direct current busses. The controller is also configured to, responsive to determining that measurement data for the primary power bus fails to satisfy a power criterion, actuate a switch of the power transfer unit to cause the power transfer unit to receive power from a secondary power bus.

According to another implementation of the present disclosure, a method of powering a flight test system during flight testing of an aircraft includes selecting, at a power transfer unit, to receive power via a current signal from a primary power bus. The primary power bus is selected from one of a plurality of alternating current power busses or a plurality of direct current power busses of an aircraft. The method also includes receiving, at a conditioning unit, the current signal from the power transfer unit based on the selection. The method further includes rectifying, at the conditioning unit, the current signal to generate a rectified signal in response to the current signal corresponding to an alternating current signal from one of the plurality of alternating current power busses. Rectification operations are bypassed in response to the current signal corresponding to a direct current signal from one of the plurality of direct current power busses. The method also includes storing energy of the rectified signal at an energy buffer of the conditioning unit. The method further includes generating a conditioned alternating current signal based on the rectified signal. The method also includes outputting the conditioned alternating current signal to an output terminal that is coupled to a load of a flight test system. The method further includes receiving, at a controller, measurement data for each alternating current power bus and measurement data for each direct current bus of the plurality of direct current power busses. The method also includes, responsive to determining that measurement data for the primary power bus fails to satisfy a power criterion, actuating a switch of the power transfer unit to cause the power transfer unit to receive power from a secondary power bus.

One advantage of the above-described implementation is the ability to provide uninterrupted power to a flight test system. A power transfer unit is used to select a particular power bus, and power can be provided to the flight test system even while a switch of the power transfer unit switches between different power terminals. For example, an energy buffer stores power that is used to power the flight test system during bus transferring. The techniques also enable automatic power bus switching according to power availability. Additionally, the features, functions, and advantages that have been described can be achieved independently in various implementations or may be combined in yet other implementations, further details of which are disclosed with reference to the following description and drawings.

DETAILED DESCRIPTION

Figure 1:
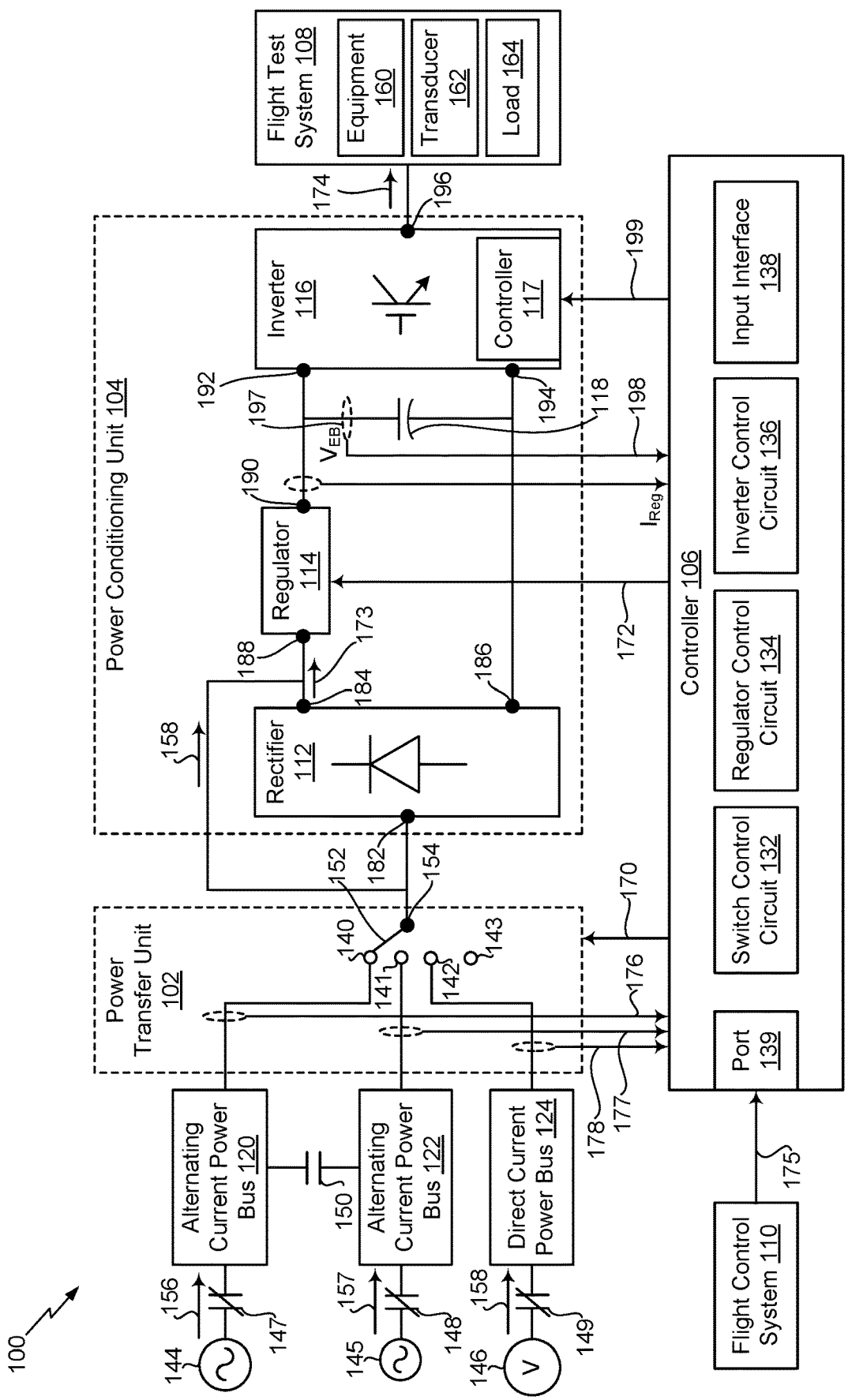
FIG. 1 is a diagram of a system that is operable to power a flight test system during flight testing of an aircraft.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, power terminals are illustrated and associated with reference numbers 140A, 140B, 140C, etc. When referring to a particular one of these power terminals, such as the power terminal 140A, the distinguishing letter "A" is used. However, when referring to any arbitrary one of these power terminals or to these power terminals as a group, the reference number 140 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram of a system 100 that is operable to power a flight test system during flight testing of an aircraft. The system 100 includes a power transfer unit 102, a power conditioning unit 104 coupled to the power transfer unit 102, and a controller 106 coupled to the power transfer unit 102 and to the power conditioning unit 104. For example, the controller 106 is coupled to the power transfer unit 102 via a switch control line, and the controller 106 is coupled to the power conditioning unit 104 via a regulator control line.

Figure 2:
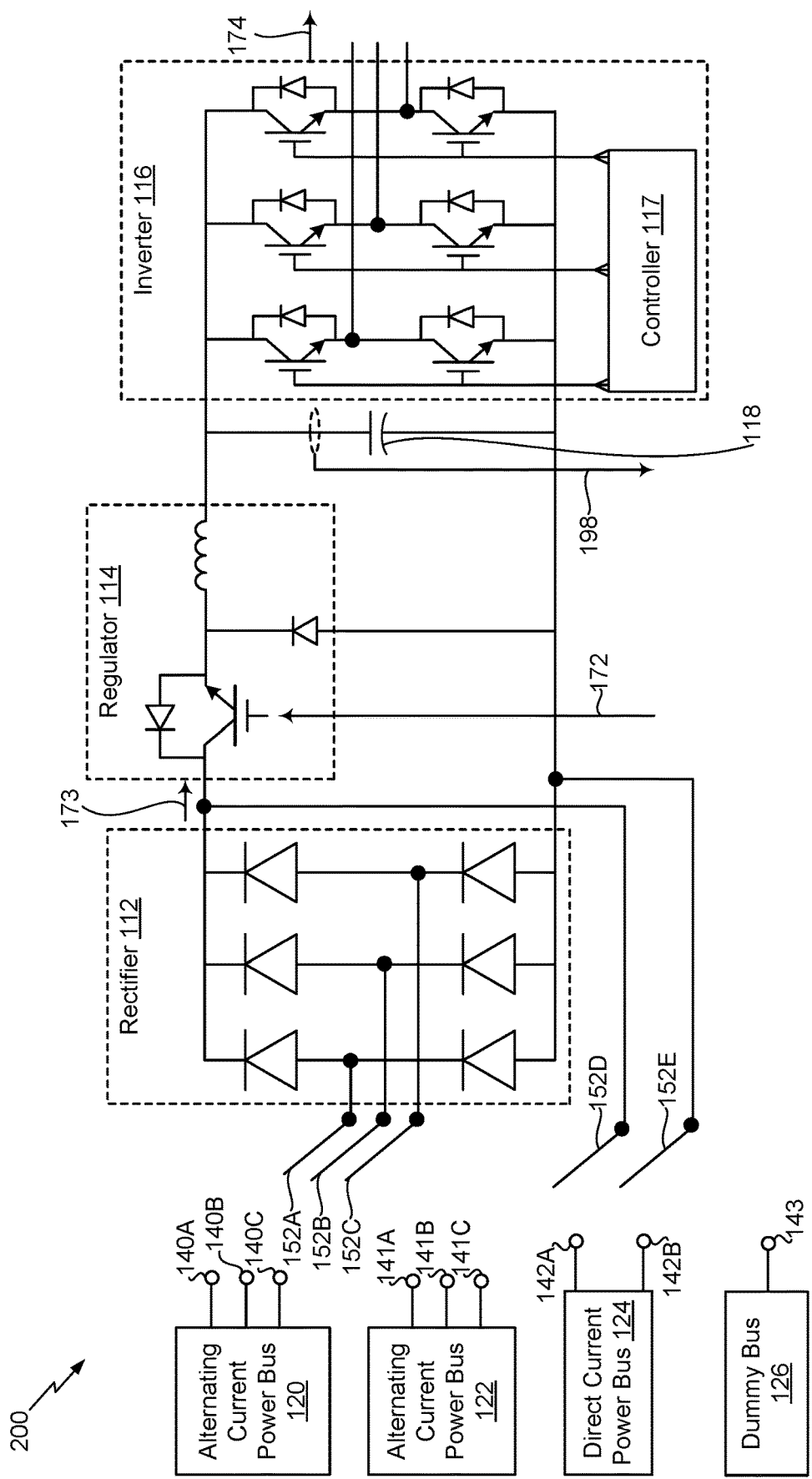
FIG. 2 is a circuit diagram of a system that is operable to power a flight test system during flight testing of an aircraft.

The power transfer unit 102 includes a plurality of power terminals 140-143. In the illustrative example of FIG. 1, the power transfer unit 102 includes a power terminal 140, a power terminal 141, a power terminal 142, and a power terminal 143. The power terminal 140 is coupled to an alternating current power bus 120 (e.g., a primary alternating current power bus), the power terminal 141 is coupled to an alternating current power bus 122 (e.g., a secondary alternating current power bus), the power terminal 142 is coupled to a direct current power bus 124, and the power terminal 143 is coupled to a dummy bus 126 (as illustrated in FIG. 2). Although two alternating current power busses 120, 122 are illustrated in FIG. 1, in some implementations, the system 100 can include additional alternating current power busses coupled to corresponding power terminals. Although one direct current power bus 124 is illustrated in FIG. 1, in some implementations, the system 100 includes additional direct current power busses (e.g., a plurality of direct current power busses) coupled to corresponding power terminals. According to one implementation, a circuit breaker 150 is coupled between the alternating current power bus 120 and the alternating current power bus 122 to enable the alternating current power busses 120, 122 to be powered by a single alternating current source.

In the illustrative example of FIG. 1, the alternating current power bus 120 is coupled to an alternating current voltage source 144 (e.g., a primary alternating current voltage source). According to one implementation, a closed circuit breaker 147 is coupled between the alternating current power bus 120 and the alternating current voltage source 144. The alternating current voltage source 144 generates an alternating current signal 156 (e.g., a primary alternating current signal) that propagates to the power terminal 140 via the alternating current power bus 120. The alternating current power bus 122 is coupled to an alternating current voltage source 145 (e.g., a secondary alternating current voltage source). According to one implementation, a closed circuit breaker 148 is coupled between the alternating current power bus 122 and the alternating current voltage source 145. The alternating current voltage source 145 generates an alternating current signal 157 (e.g., a secondary alternating current signal) that propagates to the power terminal 141 via the alternating current power bus 122. The direct current power bus 124 is coupled to a direct current voltage source 146. According to one implementation, a closed circuit breaker 149 is coupled between the direct current power bus 124 and the direct current voltage source 146. The direct current voltage source 146 generates a direct current signal 158 that propagates to the power terminal 142 via the direct current power bus 124.

The power transfer unit 102 also includes a switch 152 that is coupled to a power transfer unit output terminal 154. The switch 152 is responsive to a control signal 170 that is provided by the controller 106. The switch 152 is configured to selectively couple the power transfer unit output terminal 154 to a selected one of the plurality of power terminals 140-143. To illustrate, the switch 152 is responsive to the switch control line to couple to one of the power terminals 140-143 to the power transfer unit output terminal 154. If the switch 152 is coupled to the power terminal 140, the alternating current signal 156 generated by the alternating current voltage source 144 is propagated to the power conditioning unit 104 via the power transfer unit output terminal 154. If the switch 152 is coupled to the power terminal 141, the alternating current signal 157 generated by the alternating current voltage source 145 is propagated to the power conditioning unit 104 via the power transfer unit output terminal 154. If the switch 152 is coupled to the power terminal 142, the direct current signal 158 generated by the direct current voltage source 146 is propagated to the power conditioning unit 104 via the power transfer unit output terminal 154. If the switch 152 is coupled to the power terminal 143, no current signal is provided to the power conditioning unit 104.

The power conditioning unit 104 includes a rectifier 112 having an input terminal 182 coupled to the power transfer unit output terminal 184. The power conditioning unit 104 also includes a regulator 114 having an input terminal 188 coupled to an output terminal 184 of the rectifier 112. The power conditioning unit 104 also includes an energy buffer 118 coupled to an output terminal 190 of the regulator 114. In the illustrative example of FIG. 1, the energy buffer 118 includes a capacitor having a first terminal coupled to the output terminal 190 of the regulator and having a second terminal coupled to an output terminal 186 of the rectifier 112. Although a capacitor is illustrated in FIG. 1, in other implementations, the energy buffer 118 can include an ultra-capacitor, a battery, a flywheel, etc. The power conditioning unit 104 also includes an inverter 116 having input terminals 192, 194 coupled to the energy buffer 118 and having an output terminal 196 coupled to a load (e.g., the flight test system 108).

The power conditioning unit 104 is configured to receive one of the alternating current signal 156, the alternating current signal 157, or the direct current signal 158 from the power transfer unit 102. In a similar manner as described above, the signal 156-158 received by the power conditioning unit 104 is based the power terminal 140-143 coupled to the switch 152. If the switch 152 is coupled to the power terminal 140, the alternating current signal 156 is provided to the input terminal 182 of the rectifier 112. In a similar manner, if the switch 152 is coupled to the power terminal 141, the alternating current signal 157 is provided to the input terminal 182 of the rectifier 112. However, if the switch 152 is coupled to the power terminal 142, the direct current signal 158 is provided to the input terminal 188 of the regulator 114.

The description for FIG. 1 below describes a first scenario in which the switch 152 is coupled to the power terminal 140 and a second scenario in which the switch is coupled to the power terminal 142. For ease of illustration, other scenarios are omitted, such as a scenario in which the switch 152 is coupled to the power terminal 141. However, it should be understood that the operations of the power conditioning unit 104 are substantially similar for the first scenario and the scenario in which the switch 152 is coupled to the power terminal 141. As described in greater detail below, the second scenario is similar to the first scenario; however, rectification operations associated with the rectifier 112 are bypassed during the second scenario, and the direct current signal 158 is provided directly to the regulator 114.

According to the first scenario in which the switch 152 is coupled to the power terminal 140, the alternating current signal 156 is provided to the rectifier 112. The rectifier 112 is configured to rectify the alternating current signal 156 to generate a rectified signal 173. For example, the rectifier converts the alternating current signal 156 to a direct current signal (e.g., the rectified signal 173). The rectified signal 173 is provided to the regulator 114. The regulator 114 is configured to control a voltage level of the rectified signal 173 based on a control signal 172. For example, the regulator 114 can adjust (e.g., increase or decrease) the voltage of the rectified signal 173 based on the control signal 172 generated by the controller 106. Operations of the controller 106 are explained in greater detail below. The energy buffer 118 is configured to store energy of a regulated version of the rectified signal 173. For example, the energy buffer 118 (e.g., the capacitor) charges based on a voltage level of the regulated version of the rectified signal 173. As described below, the energy stored at the energy buffer 118 can be used (e.g., extracted) to power the flight test system 108 during a switching time period when the switch 152 switches between different power terminals 140-143. The inverter 116 is configured to generate a conditioned alternating current signal 174 based on the regulated version of the rectified current signal 173. For example, the inverter 116 converts the regulated version of the rectified signal 173 to an alternating current signal (e.g., the conditioned alternating current signal 174) and outputs the conditioned alternating current signal 174 to an output terminal 196 that is configured to be coupled to a load (e.g., the flight test system 108).

According to the second scenario in which the switch 152 is coupled to the power terminal 142, the direct current signal 158 is provided to the regulator 114. For example, the power conditioning unit 104 bypasses rectification operations if the direct current signal 158 is received. The regulator 114 is configured to control a voltage level of the direct current signal 158 based on the control signal 172. For example, the regulator 114 can adjust (e.g., increase or decrease) the voltage of the direct current signal 158 based on the control signal 172 generated by the controller 106. The energy buffer 118 is configured to store energy of a regulated version of the direct current signal 158. For example, the energy buffer 118 (e.g., the capacitor) charges based on a voltage level of the regulated version of the direct current signal 158. The inverter 116 is configured to generate the conditioned alternating current signal 174 based on the regulated version of the direct current signal 158. For example, the inverter 116 converts the regulated version of the direct current signal 158 to an alternating current signal (e.g., the conditioned alternating current signal 174) and outputs the conditioned alternating current signal 174 to the output terminal 196 that is configured to be coupled to the flight test system 108.

In the illustrative example of FIG. 1, the flight test system 108 includes equipment 160, at least one transducer 162, and at least one other load 164. The conditioned alternating current signal 174 is provided to the flight test system 108 to power the different components 160-164 of the flight test system 108. The controller 106 is operable to control the power transfer unit 102 and the power conditioning unit 104 such that a relatively constant conditioned alternating current signal 174 is provided to the flight test system 108 to prevent power glitches and output power transients at the flight test system 108. For example, the controller 106 includes a flight control system port 139 that is configured to receive one or more signals 175 from a flight control system 110 of an aircraft. The controller 106 is configured to control operation of the power transfer unit 102, the power conditioning unit 104, or both, responsive to the one or more signals 175. To illustrate, the one or more signals 175 can indicate whether to power the flight test system 108. If the one or more signals 175 indicate to power the flight test system 108, the switch 152 is coupled to one of the power terminals 140-142. If the one or more signals 175 indicate not to power the flight test system 108, the switch 152 is coupled to the power terminal 143.

In FIG. 1, the controller 106 includes a switch control circuit 132 (e.g. switching control circuit), a regulator control circuit 134, an inverter control circuit 136, and an input interface 138. The input interface 138 is configured to receive a user input assigning a priority to each alternating current power bus 120, 122 and indicating bus selection rules. For example, the user input can indicate that the alternating current power bus 120 is a primary bus and the alternating current power bus 122 is a secondary bus. The bus selection rules are described in greater detail with respect to FIGS. 4-6. The switch control circuit 132 is configured to receive measurement data 176 for the alternating current power bus 120, measurement data 177 for the alternating current power bus 122, and measurement data 178 for the direct current power bus 124. The measurement data 176 indicates a voltage level of the alternating current power bus 120, a harmonic distortion of the alternating current power bus 120, a frequency variation of the alternating current power bus 120, or a combination thereof. The measurement data 177 indicates a voltage level of the alternating current power bus 122, a harmonic distortion of the alternating current power bus 122, a frequency variation of the alternating current power bus 122, or a combination thereof. The measurement data 178 indicates a voltage level of the direct current power bus 124, a voltage fluctuation of the direct current power bus 124, or both. The switch control circuit 132 is configured to cause the power transfer unit 102 to select a power bus 120-124 based on the corresponding measurement data 176-178 and the user input. The logic and the operations of the switch control circuit 132 are described in greater detail with respect to FIGS. 4-6.

For ease of explanation and for consistency with the illustration in FIG. 1, assuming that the switch control circuit 132 causes the power transfer unit 102 to select the alternating current power bus 120, the switch 152 is connected to the power terminal 140, and the alternating current signal 156 is propagated to the input terminal of the rectifier 112. The rectifier 112 rectifies the alternating current signal 156 to generate the rectified signal 173, and the regulator 114 controls the voltage level of the rectified signal 173 based on the control signal 172. For example, the regulator control circuit 134 generates the control signal 172 that is provided to the regulator 114 (e.g., the voltage regulator). The regulator 114 is responsive to the control signal 172 to control the voltage level of the rectified signal 173. The logic and operations of the regulator control circuit 134 is described in greater detail with respect to FIG. 7. The inverter 116 generates the conditioned alternating current signal 174 based on the regulated version of the rectified current signal 173. The conditioned alternating current signal 174 has voltage and frequency characteristics that are targeted to enhance operation of the flight test system 108 (e.g., targeted to provide a target amount of power to the flight test system 108). For example, inverter control circuit 136 is configured to generate a control signal 199 that is provided to the inverter 116. The inverter 116 is responsive to the control signal 199 to control the voltage and frequency characteristics of the conditioned alternating current signal 174. The logic and operations of the inverter control circuit 136 is described in greater detail with respect to FIG. 8. The inverter 116 outputs the conditioned alternating current signal 174 to power the flight test system 108.

The energy buffer 118 stores energy of the regulated version of the rectified signal 173. The energy is used when the power transfer unit 102 switches between power terminals 140-142 to avoid output power switching transients (e.g., to avoid a substantial change in the voltage and frequency characteristics of the conditioned alternating current signal 174). To illustrate, an energy buffer sensor 197 is coupled to the energy buffer 118 (e.g., serially coupled to the first terminal of the energy buffer 118) and is configured to provide a signal 198 indicating a charge state of the energy buffer 118 to the controller 106. For example, the signal 198 indicates the voltage potential across the capacitor (e.g., the energy buffer 118). The controller 106 is configured to control operation of the switch 152 based at least in part on the signal 198 indicating the charge state of the energy buffer 118. To illustrate, if the switch control circuit 132 determines that the charge state of the energy buffer 118 satisfies a charge state threshold, the switch control circuit 132 can cause the power transfer unit 102 to switch to receive power from a different bus 122, 124. For example, the energy buffer 118 is sized to maintain the conditioned alternating current signal 174 provided to the flight test system 108 for a period of time (e.g., such as 100 milliseconds) that is longer than the time to switch the power transfer unit 102 between the alternating current power bus 120 and another power bus, such as the alternating current power bus 122.

To illustrate, if the switch control circuit 132 determines that the measurement data 176 for the alternating current power bus 120 fails to satisfy a power criterion, the switch control circuit 132 can actuate the switch 152 of the power transfer unit 102 to cause the power transfer unit 102 to receive power from the alternating current power bus 122. The power criterion can indicate a threshold power level, a threshold voltage, a threshold frequency, or a threshold frequency variation. During switching from the alternating current power bus 120 to the alternating current power bus 122, the inverter 116 outputs the conditioned alternating current signal 174 using the energy stored at the energy buffer 118.

As mentioned above, the inverter 116 is responsive to the control signal 199 to control the voltage and frequency characteristics of the conditioned alternating current signal 174. Thus, the voltage and frequency characteristics of the conditioned alternating current signal 174 remain substantially unaffected by switching from the alternating current power bus 120 to the alternating current power bus 122. According to one implementation, the alternating current power bus 120 is associated with a first set of voltage and frequency characteristics, the alternating current power bus 122 is associated with a second set of voltage and frequency characteristics that can be different from the first set of voltage and frequency characteristics. In this implementation, the conditioned alternating current signal 174 is associated with a third set of voltage and frequency characteristics. The third set of voltage and frequency characteristics is independent of which of the plurality of alternating current power busses 120, 122 is selected via the power transfer unit 102.

While the power transfer unit 102 is receiving power from the alternating current power bus 122, the switch control circuit 132 can receive updated measurement data 176 for the alternating current power bus 120. For example, the updated measurement data 176 can indicate an updated voltage level of the alternating current power bus 120, an updated harmonic distortion of the alternating current power bus 120, an updated frequency variation of the alternating current power bus 120, or a combination thereof. Responsive to determining that the updated measurement data 176 satisfies the power criterion, the switch control circuit 132 is configured to determine whether the charge state of the energy buffer 118 satisfies the charge state threshold. In response to a determination that the charge state of the energy buffer 118 satisfies the charge state threshold, the switch control circuit 132 can cause the power transfer unit 102 to switch to receiving power from the alternating current power bus 120 (e.g., switch back to the primary alternating current power bus).

The system 100 of FIG. 1 enables the power supply to the flight test system 108 to remain uninterrupted while the switch 152 switches between different power terminals 140-142. For example, the energy buffer 118 stores power that is used to power the flight test system 108 during bus transferring (e.g., while the switch 152 couples the power transfer unit output terminal 154 to a different power bus 120-124). The system 100 also enables automatic power bus switching according to power availability. For example, the switch 152 connects different power busses 120-124 to the power transfer unit output terminal 154 based on the measurement data 176-178 indicating power states of the power busses 120-124, respectively. Additionally, converting signals to direct current signals and then to alternating current signals reduces a load un-balance of power associated with an aircraft system.

FIG. 2 is a circuit diagram of a system 200 that is operable to power a flight test system during flight testing of an aircraft. The system 200 includes the alternating current power bus 120, the alternating current power bus 122, the direct current power bus 124, a dummy bus 126, the rectifier 112, the regulator 114, and the inverter 116.

Each alternating current power bus 120, 122 is coupled to three power terminals 140, 141. For example, the alternating current power bus 120 is coupled to a power terminal 140A, a power terminal 140B, and a power terminal 140C. In the example illustrated in FIG. 2, each alternating current power bus 120, 122 provides three-phase power, and each power terminal 140A-140C is associated with a different phase of the alternating current signal 156. As a non-limiting example, the power terminal 140A is coupled to propagate components of the alternating current signal 156 with a 0 degree phase, the power terminal 140B is coupled to propagate components of the alternating current signal 156 with a 120 degree phase, and the power terminal 140C is coupled to propagate components of the alternating current signal 156 with a 240 degree phase. In a similar manner, each power terminal 141A-141C is associated with a different phase of the alternating current signal 157. As a non-limiting example, the power terminal 141A is coupled to propagate components of the alternating current signal 157 with a 0 degree phase, the power terminal 141B is coupled to propagate components of the alternating current signal 157 with a 120 degree phase, and the power terminal 141C is coupled to propagate components of the alternating current signal 157 with a 240 degree phase. A switch 152A is configured to couple one of the power terminals 140A, 141A to a first input terminal of the rectifier 112, a switch 152B is configured to couple a corresponding one of the power terminals 140B, 141B to a second input terminal of the rectifier 112, and a switch 152C is configured to couple a corresponding one of the power terminals 140C, 141C to a third input terminal of the rectifier 112.

The rectifier 112 includes a multi-phase rectifier circuit (e.g., a three-phase rectifier circuit). In the scenario where the alternating current power bus 120 is connected to the rectifier 112, a first pair of series-coupled diodes (e.g., a first leg) of the rectifier 112 is coupled to receive the components of alternating current signal 156 with a 0 degree phase from the first switch 152A, a second pair of series-coupled diodes (e.g., a second leg) of the rectifier 112 is coupled to receive the components of the alternating current signal 156 with a 120 degree phase from the second switch 152B, and a third pair of series-coupled diodes (e.g., a third leg) of the rectifier 112 is coupled to receive the components of the alternating current signal 156 with a 240 degree phase from the third switch 152C. The rectifier 112 converts each set of components of the alternating current signal 156 from alternating current to direct current to generate the rectified signal 173.

The direct current bus 124 is coupled to a power terminal 142A and to a power terminal 142B (e.g., a ground terminal). A switch 152D is configured to couple the power terminal 142A an input terminal of the regulator 114, a switch 152E is configured to couple the power terminal 142B to ground.

The regulator 114 includes a switch coupled in parallel with a diode and an inductor coupled to an output of the switch and the diode. The switch can include a metal-oxide-semiconductor field-effect-transistor (MOSFET) or an insulated-gate bipolar transistor (IGBT). The switch is configured to receive the control signal 172 from the controller 106 to control the conducting time of the regulator 114 to adjust the current (e.g., the rectified signal 173 or the direct current signal 158). The inductor is operable to smooth the output current (e.g., the regulated version of the rectified signal 173). It should be noted that the topology of the regulator 114 in FIG. 2 is for illustrative purposes and should not be construed as limiting. Other regulation circuit topologies can also be implemented with the techniques described herein.

The inverter 116 includes a multi-phase inverter circuit (e.g., a three-phase inverter circuit). A first pair of switches (e.g., a first leg) of the inverter 116 is coupled to receive the rectified signal 173 and convert the rectified signal 173 into a first phase of a multi-phase (e.g., three-phase) alternating current signal. For example, the first pair of switches of the inverter 116 can output a first component of the conditioned alternating current signal 174 having a phase of 0 degrees. Similarly, a second pair of switches (e.g., a second leg) of the inverter 116 is coupled to receive the rectified signal 173 and convert the rectified signal 173 into a second component of the conditioned alternating current signal 174 having a phase of 120 degrees. A third pair of switches (e.g., a third leg) of the inverter 116 is coupled to receive the rectified signal 173 and convert the rectified signal 173 into a third component of the conditioned alternating current signal 174 having a phase of 240 degrees. Thus, the inverter 116 converts direct current power (e.g., the rectified signal 173) into alternating current power (e.g., the conditioned alternating current signal 174). The switches included in the inverter 116 can include IGBTs, MOSFETs, bipolar junction transistors (BJTs), etc. The inverter 116 can be disabled by disabling each switch. The controller 117 can control the voltage and the frequency of the conditioned alternating current signal 174. For example, data associated with the user input is provided to the controller 117, and the controller 117 adjusts the voltages applied to the switches to generate the target voltage and target frequency of the conditioned alternating current signal 174.

The system 200 of FIG. 2 enables isolation of noise and interfacing between an aircraft power system (e.g., the voltage sources 144-146) and the flight test system 108 (e.g., a test equipment system). For example, the rectifier 112 converts alternating current power to direct current power, which reduces negative impacts on power quality. Additionally, converting to direct current power prior to outputting alternating current power enables the voltage and frequency of the output to be different from the voltage and frequency of the input. As a result, the system 200 provides a relatively large amount of flexibility with reduced costs and labor.

Figure 3:
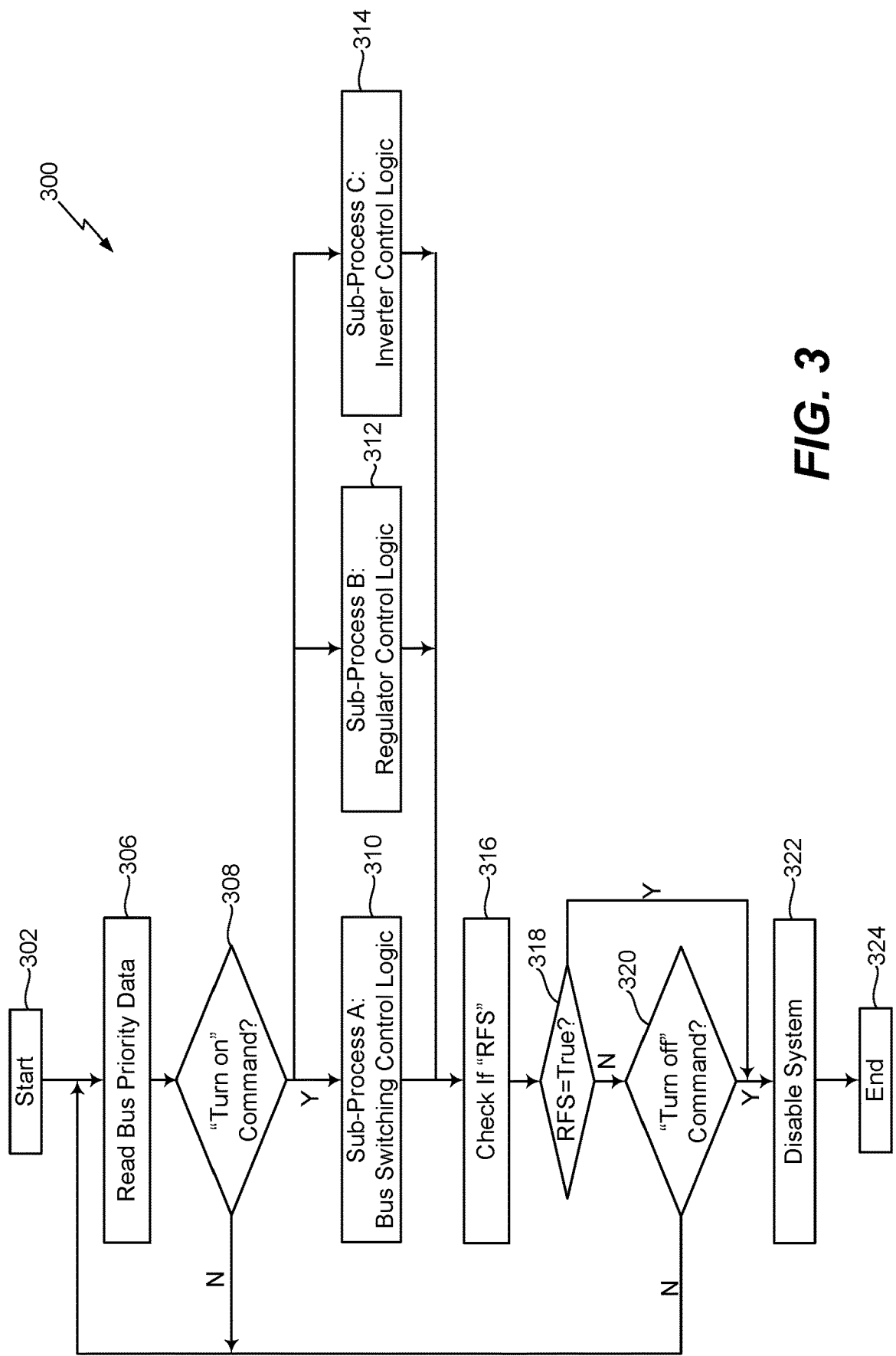
FIG. 3 is a flowchart of a process for a controller that is operable to power a flight test system during flight testing of an aircraft.

FIG. 3 is a flowchart of a process 300 for a controller that is operable to power a flight test system during flight testing of an aircraft. For example, the operations described in the process 300 (e.g., the routine) can be performed by the controller 106 of FIG. 1.

The operations of the process 300 start, at 302. At 306, the controller 106 reads bus priority data. For example, a user can provide user input, via the input interface 138, to assign a priority to each alternating current power bus 120, 122. In this example, the controller 106 reads the user input (or stored data indicating the assigned priorities) to assign a priority to each alternating current power bus 120, 122. For example, the user input can indicate that the alternating current power bus 120 is a primary bus and the alternating current power bus 122 is a secondary bus. At 308, the controller 106 determines whether an activation command (e.g., a "turn on" command) is received. For example, the controller 106 can receive the one or more signals 175 and determine whether the one or more signals 175 indicate to power the flight test system 108. Thus, the activation command can correspond to an indication to power the flight test system 108. If the controller 106 fails to receive the activation command, the process 300 goes back to 306. However, if the controller 106 receives the activation command, the process 300 goes to 310-314.

At 310, the controller 106 executes bus switching logic (e.g., "Sub-Process A") to control actuation of the switch 152. For example, the switch control circuit 132 executes the bus switching logic to couple the power transfer unit output terminal 154 to one of the power terminals 140-143. The bus switching logic is described in greater detail with respect to FIGS. 4-6. At 312, the controller 106 executes regulator control logic (e.g., "Sub-Process B") to control the voltage level of the rectified signal 173 (or the voltage level of the direct current signal 158 if the switch 152 is coupled to the power terminal 142). For example, the regulator control circuit 134 executes the regulator control logic to control the voltage level of the rectified signal 173. The regulator control logic is described in greater detail with respect to FIG. 7. At 314, the controller 106 executes inverter control logic (e.g., "Sub-Process C") to control the voltage and frequency characteristics of the conditioned alternating current signal 174. For example, inverter control circuit 136 executes the inverter control logic to control the voltage and frequency characteristics of the conditioned alternating current signal 174. The inverter control logic is described in greater detail with respect to FIG. 8.

At 316, the controller 106 determines a "Return from Sub-Process" (RFS) status of the process 300. The RFS status can be a true RFS or a false RFS. The true RFS indicates that the sub-processes, at 310-314, have been successfully completed. The false RFS indicates that a problem with one or more of the sub-processes, at 310-314, or incomplete performance of one or more of the sub-processes, at 310-314. At 318, if the RFS status is a true RFS, the system 100 is disabled, at 322. Disabling the system 100 can include actuating the switch 152 to couple to the dummy bus 126. After the system 100 is disabled, the process 300 ends, at 324. However, at 318, if the RFS status is a false RFS and a "turn off" command is received, at 320, the process returns to 306.

The process 300 of FIG. 3 enables the power supply to the flight test system 108 to remain uninterrupted while the switch 152 switches between different power terminals 140-142. For example, the energy buffer 118 stores power that is extracted and used to power the flight test system 108 during bus transferring (e.g., while the switch 152 couples the power transfer unit output terminal 154 to a different power bus 120-124). The system 100 also enables automatic power bus switching according to power availability. For example, the switch 152 connects different power busses 120-124 to the power transfer unit output terminal 154 based on the measurement data 176-178 indicating power states of the power busses 120-124, respectively. Additionally, converting signals to direct current signals and then to alternating current signals reduces a load un-balance of power associated with an aircraft system.

Figure 4:
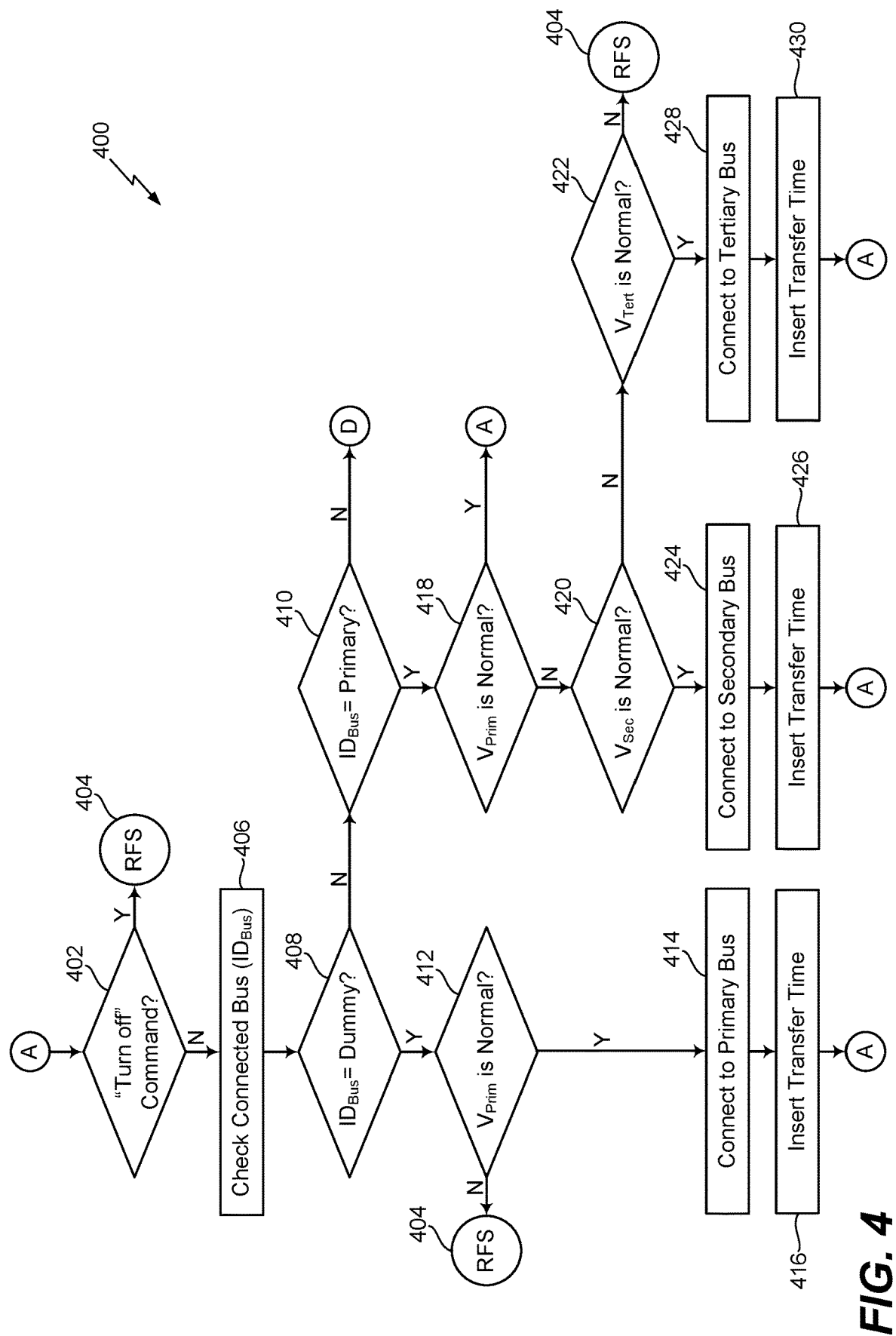
FIG. 4 is a flowchart of a process diagram of bus switching control logic for a switch control circuit included in the system of FIG. 1.

FIG. 4 is a flowchart of a process diagram of bus switching control logic 400 for a switch control circuit. The bus switching control logic 400 can correspond to a portion of the bus switching control logic illustrated at block 310 of FIG. 3. The bus switching control logic 400 can be implemented at the switch control circuit 132.

At 402, the switch control circuit 132 determines whether a deactivation command (e.g., a "turn off" command) is received. For example, the switch control circuit 132 can receive the one or more signals 175 and determine whether the one or more signals 175 indicate not to power the flight test system 108. According to one implementation, at least one signal of the one or more signals 175 includes an emergency stop signal to terminate power to the flight test system 108. Thus, the deactivation command can correspond to an indication not to power the flight test system 108. If the switch control circuit 132 receives the deactivation command, a true RFS is determined, at 404, and the bus switching control logic 400 is bypassed. However, if the switch control circuit 132 fails to receive the deactivation command, the switch control circuit 132 determines which power bus is connected to the power transfer unit output terminal 154 via the switch 152, at 406.

At 408, the switch control circuit 132 determines whether the dummy bus 126 is connected to the power transfer unit output terminal 154. If the dummy bus 126 is not connected to the power transfer unit output terminal 154, the switch control circuit 132 determines whether the primary alternating current power pus 120 is connected to the power transfer unit output terminal 154, at 410. However, if the dummy bus 126 is connected to the power transfer unit output terminal 154, the switch control circuit 132 determines whether the voltage level of the primary alternating current power bus 120 is "normal," at 412. As used herein, the voltage level is "normal" if the voltage level is within a specified voltage range, such as a voltage range designated by a user or a voltage range designated by another specification, such as a design specification or an industry specification. The switch control circuit 132 can check the measurement data 176 to determine whether the voltage level of the primary alternating current power bus 120 is normal. If the voltage level of the primary alternating current power bus 120 is not normal, a true RFS is determined, at 404, and the bus switching control logic 400 is bypassed. However, if the voltage level of the primary alternating current power bus is normal, the switch control circuit 132 actuates the switch 152 to connect the primary alternating current power bus 120 to the power transfer unit output terminal 154, at 414. Additionally, the switch control circuit 132 waits for a transfer time duration, at 416, (e.g. inserts transfer time) prior to returning to 402. As described herein, the "transfer time duration" indicates the amount of time for the switch 152 to connect to a different power terminal.

Figure 5:
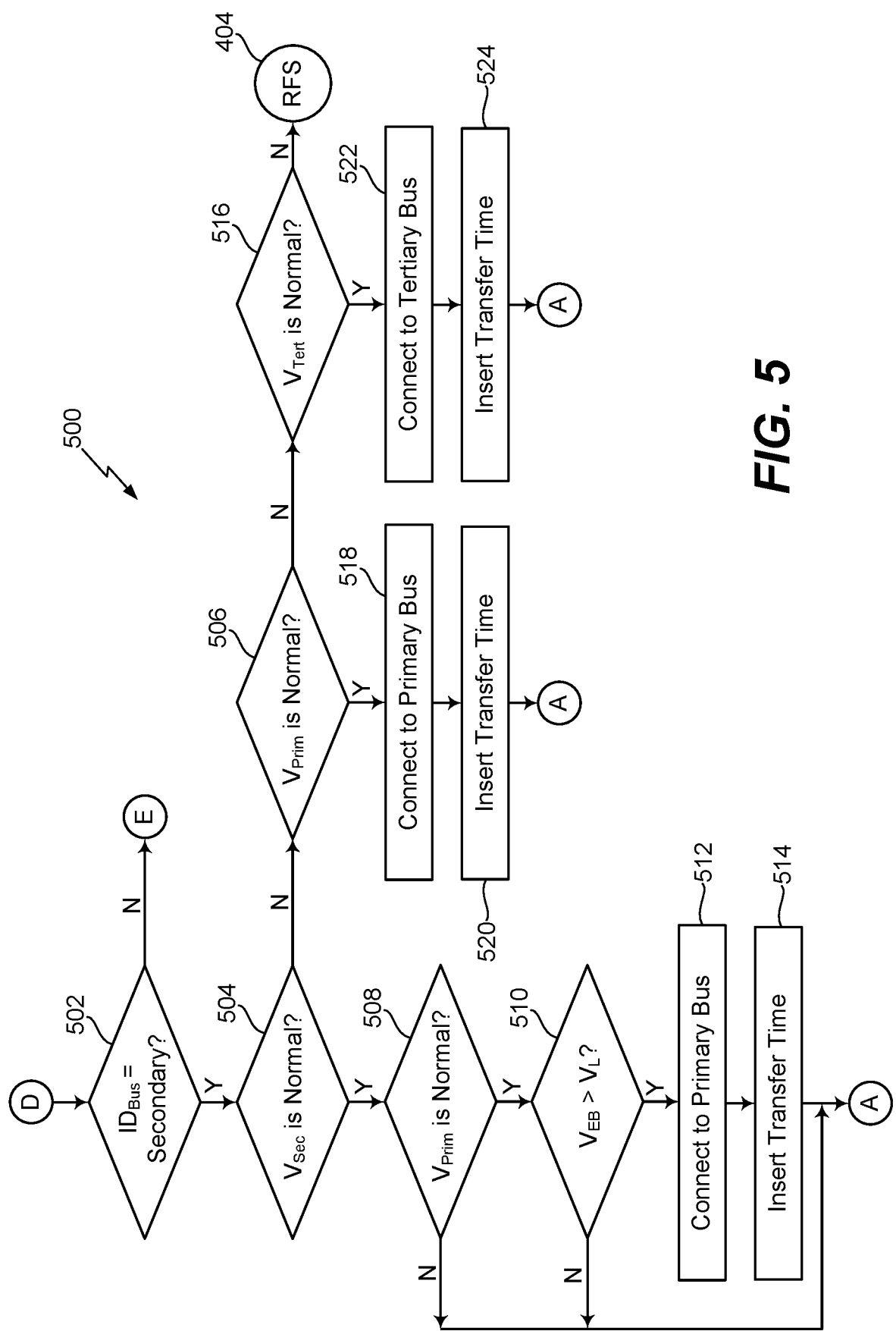
FIG. 5 is a flowchart of another process diagram of bus switching control logic for the switch control circuit.

If the primary alternating current power bus 120 is not connected to the power transfer unit output terminal 154, at 410, the switch control circuit 132 uses switching control logic described with respect to FIG. 5. However, if the primary alternating current power bus 120 is connected to the power transfer unit output terminal 154, at 410, the switch control circuit 132 determines whether the voltage level of the primary alternating current power bus 120 is normal, at 418. If the voltage level of the primary alternating current bus 120 is normal, at 418, the switch control circuit 132 returns to 402. If the voltage level of the primary alternating current power bus 120 is not normal, at 418, the switch control circuit 132 determines whether the voltage level of the secondary alternating current power bus 122 is normal, at 420. If the voltage level of the secondary alternating current bus 122 is not normal, at 420, the switch control circuit 132 determines whether a voltage level of a tertiary current power bus (e.g., the direct current power bus 124, another alternating current power bus, or another direct current power bus) is normal, at 422. If the voltage level of the secondary alternating current bus 122 is normal, at 420, the switch control circuit 132 actuates the switch 152 to connect the secondary alternating current power bus 122 to the power transfer unit output terminal 154, at 424. Additionally, the switch control circuit 132 waits for the transfer time duration, at 426, (e.g. inserts transfer time) prior to returning to 402.

If the voltage level of the tertiary current power bus is not normal, at 422, a true RFS is determined, at 404, and the bus switching control logic 400 is bypassed. If the voltage level of the tertiary current power bus is normal, at 422, the switch control circuit 132 actuates the switch 152 to connect the tertiary current power bus to the power transfer unit output terminal 154, at 428. Additionally, the switch control circuit 132 waits for the transfer time duration, at 430, (e.g. inserts transfer time) prior to returning to 402.

FIG. 5 is a flowchart of another process diagram of bus switching control logic 500 for the switch control circuit. The bus switching control logic 500 can correspond to a portion of the bus switching control logic illustrated at block 310 of FIG. 3. The bus switching control logic 500 can be implemented at the switch control circuit 132.

At 502, the switch control circuit 132 determines whether the secondary alternating current power bus 122 is connected to the power transfer unit output terminal 154. If the secondary alternating current power bus 122 is not connected to the power transfer unit output terminal 154, at 502, the switch control circuit 132 uses switching control logic described with respect to FIG. 6. If the secondary alternating current power bus 122 is connected to the power transfer unit output terminal 154, at 502, the switch control circuit 132 determines whether the voltage level of the secondary alternating current power bus 122 is normal, at 504. The switch control circuit 132 can check the measurement data 177 to determine whether the voltage level of the secondary alternating current power bus 122 is normal. If the voltage level of the secondary alternating current power bus 122 is not normal, at 504, the switch control circuit 132 determines whether the voltage level of the primary alternating current power bus 120 is normal, at 506.

However, if the voltage level of the secondary alternating current power bus 122 is normal, at 504, the switch control circuit 132 determines whether the voltage level of the primary alternating current power bus 120 is normal, at 508. If the voltage level of the primary alternating current power bus 120 is not normal, at 508, the switch control circuit 132 returns to 402. If the voltage level of the primary alternating current power bus 120 is normal, at 508, the switch control circuit 132 determines whether the charge state ($V_{EB}$) of the energy buffer 118 satisfies (e.g., is greater than) the charge state threshold ($V_L$), at 510. If the charge state of the energy buffer 118 fails to satisfy the charge state threshold, at 510, the switch control circuit 132 returns to 402. However, if the charge state of the energy buffer 118 satisfies the charge state threshold, at 510, the switch control circuit 132 actuates the switch 152 to connect the primary alternating current power bus 120 to the power transfer unit output terminal 154, at 512. Additionally, the switch control circuit 132 waits for the transfer time duration, at 514, (e.g. inserts transfer time) prior to returning to 402.

If the voltage level of the primary alternating current power bus 120 is not normal, at 506, the switch control circuit 132 determines whether the voltage level of the tertiary current power bus is normal, at 516. However, if the voltage level of the primary alternating current power bus 120 is normal, at 506, the switch control circuit 132 actuates the switch 152 to connect the primary alternating current power bus 120 to the power transfer unit output terminal 154, at 518. Additionally, the switch control circuit 132 waits for the transfer time duration, at 520, (e.g. inserts transfer time) prior to returning to 402.

If the voltage level of the tertiary current power bus is not normal, at 516, a true RFS is determined, at 404, and the switching control logic 500 is bypassed. However, if the voltage level of the tertiary current power bus is normal, at 516, the switch control circuit 132 actuates the switch 152 to connect the tertiary current power bus to the power transfer unit output terminal 154, at 522. For example, in the scenario where the tertiary current power bus is the direct current power bus 124, the switch control circuit 132 connects the direct current power bus 124 to the power transfer unit output terminal 154. Additionally, the switch control circuit 132 waits for the transfer time duration, at 524, (e.g. inserts transfer time) prior to returning to 402.

Figure 6:
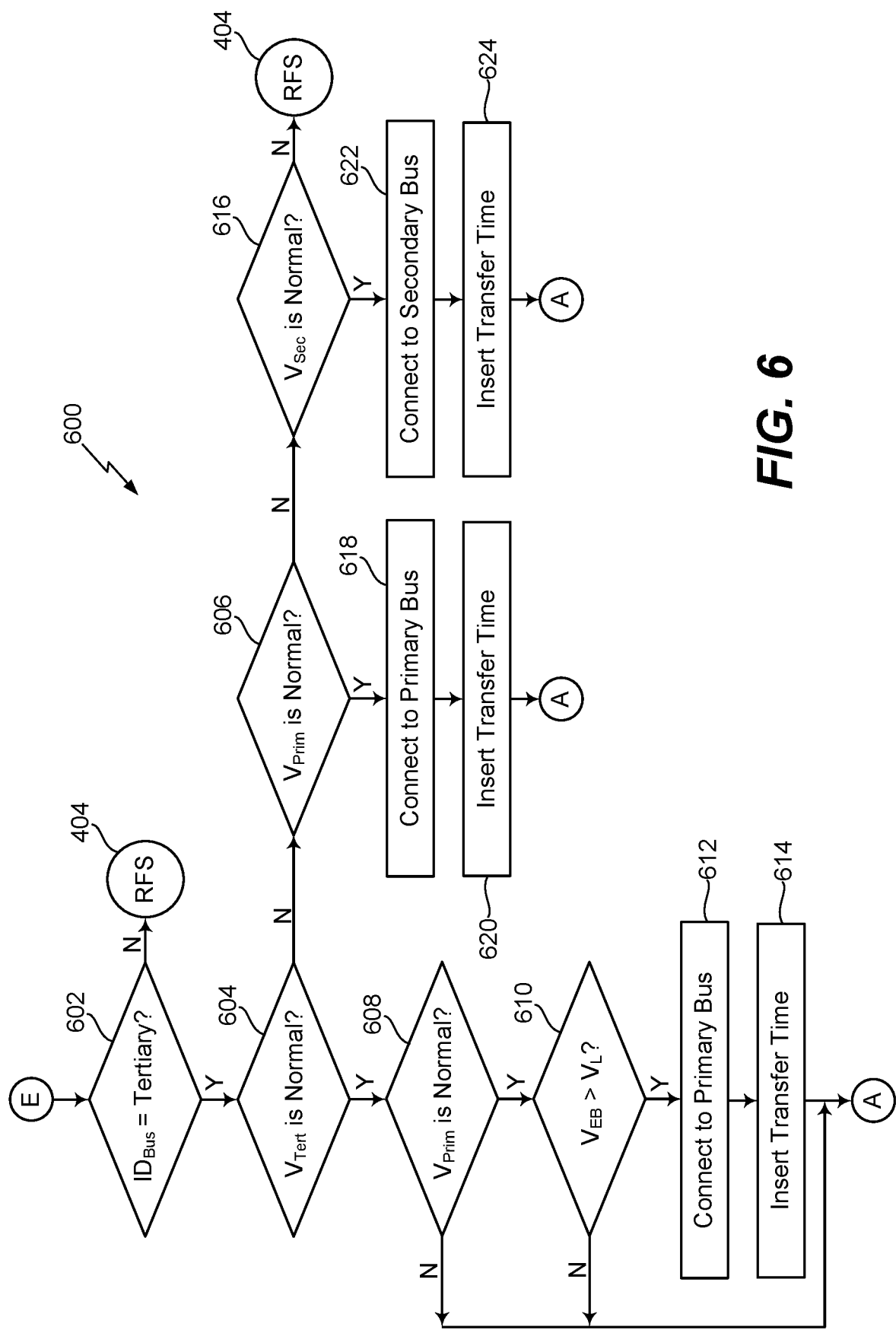
FIG. 6 is a flowchart of another process diagram of bus switching control logic for the switch control circuit.

FIG. 6 is a flowchart of another process diagram of bus switching control logic 600 for the switch control circuit. The bus switching control logic 600 can correspond to a portion of the bus switching control logic illustrated at block 310 of FIG. 3. The bus switching control logic 600 can be implemented at the switch control circuit 132.

At 602, the switch control circuit 132 determines whether the tertiary current power bus is connected to the power transfer unit output terminal 154. For example, in the scenario where the direct current power bus 124 is the tertiary current power bus, the switch control circuit 132 determines whether the direct current power bus 124 is connected to the power transfer unit output terminal 154. If the tertiary current power bus is not connected to the power transfer unit output terminal 154, at 602, a true RFS is determined, at 404, and the switching control logic 600 is bypassed. If the tertiary current power bus is connected to the power transfer unit output terminal 154, at 602, the switch control circuit 132 determines whether the voltage level of the tertiary current power bus is normal, at 604. For example, in the scenario where the direct current power bus 124 is the tertiary current power bus, the switch control circuit 132 can check the measurement data 178 to determine whether the voltage level of the direct current power bus 124. If the voltage level of the tertiary current power bus is not normal, at 604, the switch control circuit 132 determines whether the voltage level of the primary alternating current power bus 120 is normal, at 606.

However, if the voltage level of the tertiary current power bus is normal, at 604, the switch control circuit 132 determines whether the voltage level of the primary alternating current power bus 120 is normal, at 608. If the voltage level of the primary alternating current power bus 120 is not normal, at 608, the switch control circuit 132 returns to 402. If the voltage level of the primary alternating current power bus 120 is normal, at 608, the switch control circuit 132 determines whether the charge state ($V_{EB}$) of the energy buffer 118 satisfies (e.g., is greater than) the charge state threshold ($V_L$), at 610. If the charge state of the energy buffer 118 fails to satisfy the charge state threshold, at 610, the switch control circuit 132 returns to 402. However, if the charge state of the energy buffer 118 satisfies the charge state threshold, at 610, the switch control circuit 132 actuates the switch 152 to connect the primary alternating current power bus 120 to the power transfer unit output terminal 154, at 612. Additionally, the switch control circuit 132 waits for the transfer time duration, at 614, (e.g. inserts transfer time) prior to returning to 402.

If the voltage level of the primary alternating current power bus 120 is not normal, at 606, the switch control circuit 132 determines whether the voltage level of the secondary alternating current power bus 122 is normal, at 616. However, if the voltage level of the primary alternating current power bus 120 is normal, at 606, the switch control circuit 132 actuates the switch 152 to connect the primary alternating current power bus 120 to the power transfer unit output terminal 154, at 618. Additionally, the switch control circuit 132 waits for the transfer time duration, at 620, (e.g. inserts transfer time) prior to returning to 402.

If the voltage level of the secondary alternating current power bus 122 is not normal, at 616, a true RFS is determined, at 404, and the bus switching control logic 400 is bypassed. However, if the voltage level of the secondary alternating current power bus 122 is normal, at 616, the switch control circuit 132 actuates the switch 152 to connect the secondary alternating current power bus 122 to the power transfer unit output terminal 154, at 622. Additionally, the switch control circuit 132 waits for the transfer time duration, at 624, (e.g. inserts transfer time) prior to returning to 402.

The techniques described with respect to FIGS. 4-6 enable the switch 152 to couple the power transfer unit output terminal 154 to the power bus 122-124 that has a normal voltage level. Coupling the power bus 120-124 with the normal voltage level reduces the likelihood that an insufficient amount of power is provided to the flight test system 108, which can cause an interruption in power service.

Figure 7:
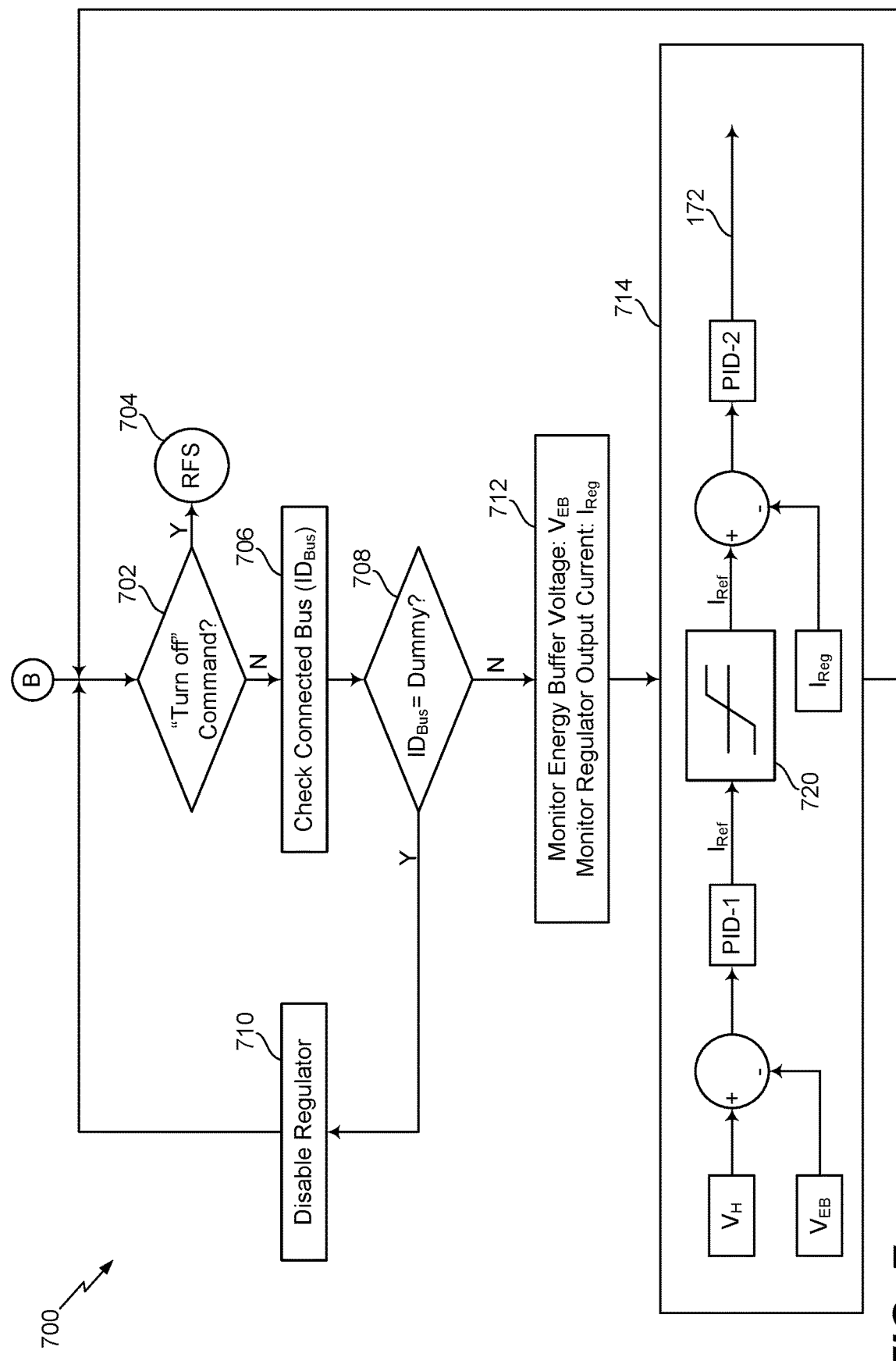
FIG. 7 is a flowchart of a process diagram of regulator control logic for a regulator control circuit included in the system of FIG. 1.

FIG. 7 is a flowchart of a process diagram of regulator control logic 700 for a regulator control circuit. The regulator control logic 700 can correspond to the regulator control logic illustrated at block 312 of FIG. 3. The regulator control logic 700 can be implemented at the regulator control circuit 134.

At 702, the regulator control circuit 134 determines whether a deactivation command (e.g., a "turn off" command) is received. For example, the regulator control circuit 134 can receive the one or more signals 175 and determine whether the one or more signals 175 indicate not to power the flight test system 108. Thus, the deactivation command can correspond to an indication not to power the flight test system 108. If the regulator control circuit 134 receives the deactivation command, a true RFS is determined, at 704, and the regulator control logic 700 is bypassed. However, if the regulator control circuit 134 fails to receive the deactivation command, the regulator control circuit 134 determines which power bus is connected to the power transfer unit output terminal 154 via the switch 152, at 706.

If the regulator control circuit 134 determines that the dummy bus 126 is connected to the power transfer unit output terminal 154, at 708, the regulator control circuit 134 disables the regulator 114, at 710. After disabling the regulator 114, at 710, the regulator control circuit 134 returns to 702. However, if the regulator control circuit 134 determines that the dummy bus 126 is not connected to the power transfer unit output terminal 154, at 708, the regulator control circuit 134 monitors the energy buffer voltage (e.g., the charge state ($V_{EB}$) of the energy buffer 118) and monitors a regulator output current ($I_{Reg}$), at 712.

In response to monitoring the energy buffer voltage and the regulator output current, at 712, the regulator control circuit 134 generates the control signal 172 to control the voltage level of the rectified signal 173 (or the direct current signal 158), at 714. For example, the regulator control circuit 134 determines a difference between a voltage level ($V_H$) and the energy buffer voltage ($V_{EB}$) and performs a first proportional integral derivate operation (PID-1) on the difference to determine a reference current ($I_{Ref}$). The reference current is provided to a current limiting block 720. The current limiting block 720 adjusts the reference current ($I_{Ref}$) to a maximum allowable current ($I_{max}$) if the reference current ($I_{Ref}$) is greater than the maximum allowable current. Additionally, the current limiting block 720 adjusts the reference current ($I_{Ref}$) to zero if the reference current ($I_{Ref}$) is less than zero. Otherwise, the current limiting block 720 passes the reference current to be compared to the regulator output current ($I_{Reg}$). A second proportional integral derivate operation (PID-2) performed on the difference between the regulator output current ($I_{Reg}$) and the reference current ($I_{Ref}$) to generate the control signal 172 provided to the regulator 114. After generating the control signal 172, at 714, the regulator control circuit 134 returns to 702.

The techniques described with respect to FIG. 7 supports an upper limit to the output current of the regulator 114. For example, the current limiting block 720 limits the current output by the regulator 114 to regulate the voltage applied to the energy buffer 118 and to regulate the charge state of the energy buffer 118. Thus, the techniques may protect the energy buffer 118 from overcharging.

Figure 8:
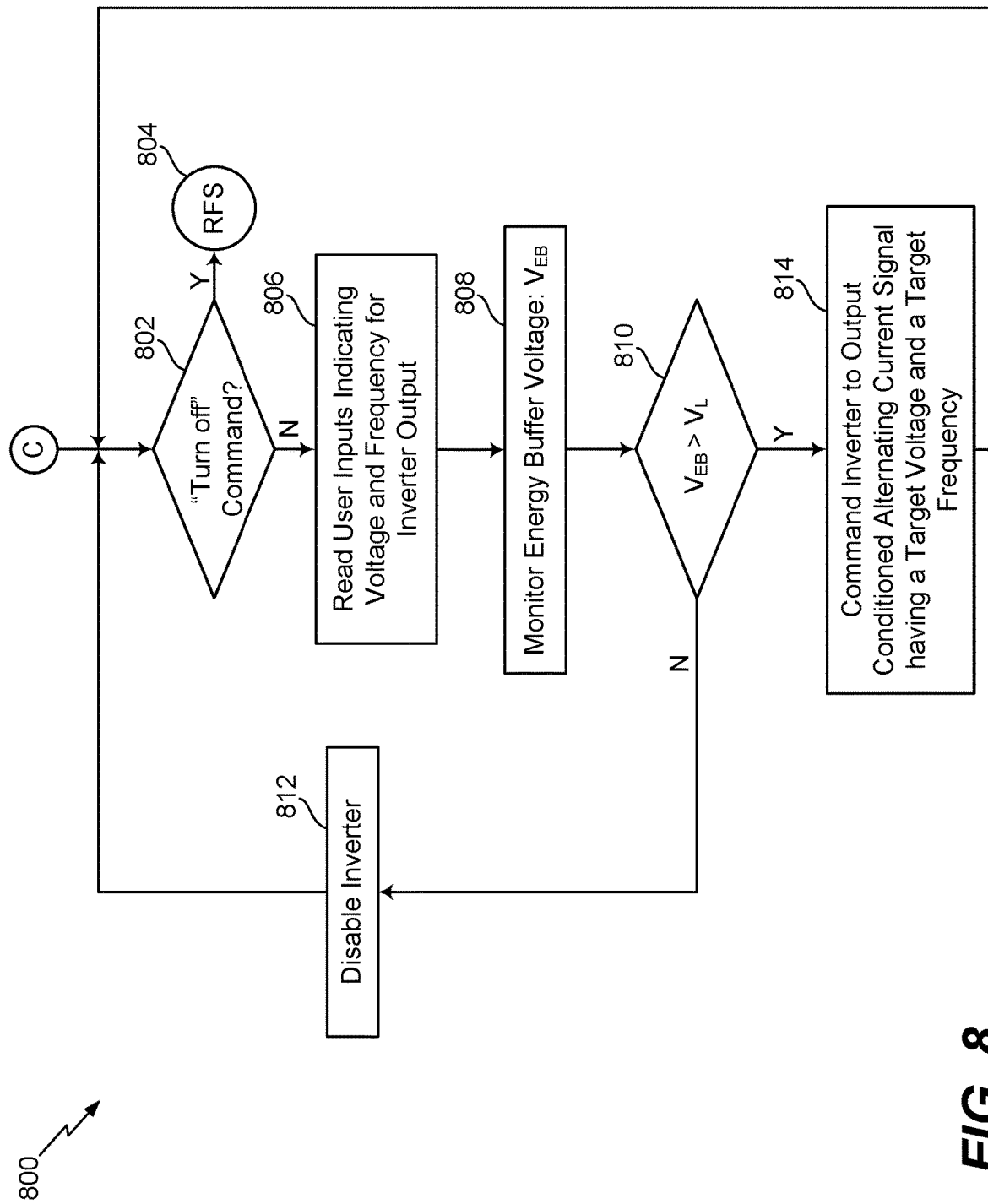
FIG. 8 is a flowchart of a process diagram of inverter control logic for an inverter control circuit included in the system of FIG. 1.

FIG. 8 is a flowchart of a process diagram of inverter control logic 800 for an inverter control circuit. The inverter control logic 800 can correspond to the inverter control logic illustrated at block 314 of FIG. 3. The inverter control logic 800 can be implemented at the inverter control circuit 136, the controller 117, or both.

At 802, the inverter control circuit 136 determines whether a deactivation command (e.g., a "turn off" command) is received. For example, the inverter control circuit 136 can receive the one or more signals 175 and determine whether the one or more signals 175 indicate not to power the flight test system 108. Thus, the deactivation command can correspond to an indication not to power the flight test system 108. If the inverter control circuit 136 receives the deactivation command, a true RFS is determined, at 804, and the inverter control logic 800 is bypassed. However, if the inverter control circuit 136 fails to receive the deactivation command, the inverter control circuit 136 reads user inputs (or other data) indicating a voltage and a frequency for the inverter output, at 806. For example, the user input received by the input interface 138 can indicate a target voltage for the conditioned alternating current signal 174 and a target frequency for the conditioned alternating current signal 174. The inverter control circuit 136 can identify (e.g., read) the target voltage and the target frequency. At 808, the inverter control circuit 136 monitors the energy buffer voltage (e.g., the charge state ($V_{EB}$) of the energy buffer 118).

At 810, the inverter control circuit 136 determines whether the charge state ($V_{EB}$) of the energy buffer 118 satisfies (e.g., is greater than) the charge state threshold ($V_L$). If the charge state ($V_{EB}$) of the energy buffer 118 fails to satisfy the charge state threshold ($V_L$), at 810, the inverter control circuit 136 disables the inverter 116, at 812, and returns to 802. However, if the charge state ($V_{EB}$) of the energy buffer 118 satisfies the charge state threshold ($V_L$), at 810, the inverter control circuit 136 commands the inverter 116 (e.g., the controller 117 of the inverter 116) to output the conditioned alternating current signal 174 having the target voltage and the target frequency, at 814.

The techniques described with respect to FIG. 8 enable the voltage and frequency characteristics of the conditioned alternating current signal 174 to be controlled. Additionally, the techniques enable the inverter 116 to be selectively disabled based on the charge state of the energy buffer 118 (e.g., the energy level in the energy buffer 118). For example, if the charge state of the energy buffer 118 is below the charge state threshold, the techniques support activation of the inverter 116 to power the flight test system 108.

Figure 9:
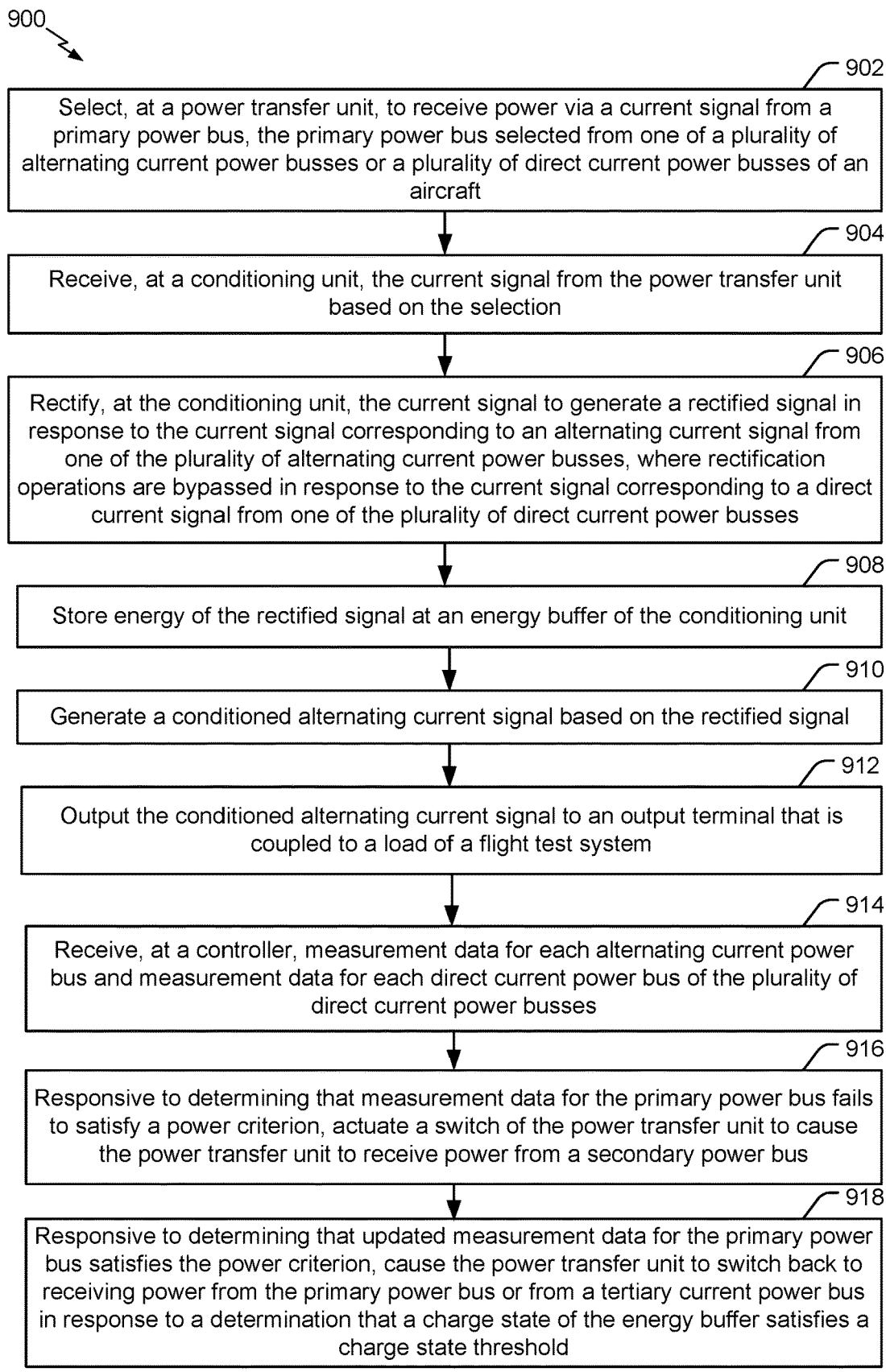
FIG. 9 is a flowchart of a method for powering a flight test system during flight testing of an aircraft.

FIG. 9 is a flowchart of a method 900 for powering a flight test system during flight testing of an aircraft. The method 900 may be performed by the system 100 of FIG. 1, the controller 106, the system 200 of FIG. 2, or a combination thereof. The method 900 may also be performed in conjunction with the techniques described with respect to FIGS. 3-8.

The method 900 includes selecting, at a power transfer unit, to receive power via a current signal from a primary power bus, at 902. The primary power bus is selected from one of a plurality of alternating current power busses or a plurality of direct current power busses of an aircraft. For example, referring to FIG. 1, the power transfer unit 102 receives the alternating current signal 156 from the primary alternating current power bus 120 of the plurality of alternating current power busses 120, 122 of the aircraft if the switch 152 connects the power terminal 140 to the power transfer unit output terminal 154.

The method 900 also includes receiving, at a conditioning unit, the current signal from the power transfer unit based on the selection, at 904. For example, referring to FIG. 1, the power conditioning unit 104 receives the alternating current signal 156 from the power transfer unit 102 if the switch 152 connects the power terminal 140 to the power transfer unit output terminal 154.

The method 900 also includes rectifying, at the conditioning unit, the current signal to generate a rectified signal in response to the current signal corresponding to an alternating current signal from one of the plurality of alternating current power busses, at 906. Rectification operations are bypassed in response to the current signal corresponding to a direct current signal from one of the plurality of direct current power busses. For example, referring to FIG. 1, the rectifier 112 rectifies the alternating current signal 156 to generate the rectified signal 173 if the alternating current signal is received by the power transfer unit 102. Alternatively, rectification operations are bypassed if the direct current signal 158 is received by the power transfer unit 102 and the direct current signal 158 is provided directly to the regulator 114.

The method 900 also includes storing energy of the rectified signal at an energy buffer of the conditioning unit, at 908. For example, referring to FIG. 1, the energy buffer 118 stores energy of the regulated version of the rectified signal 173. The method 900 also includes generating a conditioned alternating current signal based on the rectified signal, at 910. For example, referring to FIG. 1, the inverter generates the conditioned alternating current signal 174 based on the regulated version of the rectified signal 173. The method 900 also includes outputting the conditioned alternating current signal to an output terminal that is coupled to a load of a flight test system, at 912. For example, referring to FIG. 1, the inverter outputs the conditioned alternating current signal 174 to the output terminal 196 that is coupled to the flight test system 108.

The method 900 also includes receiving, at a controller, measurement data for each alternating current power bus and measurement data for each direct current power bus of the plurality of direct current power busses, at 914. For example, referring to FIG. 1, the controller 106 receives the measurement data 176 for the primary alternating current power bus 120, the measurement data 177 for the secondary alternating current power bus 122, and the measurement data 178 for the direct current power bus 124. The method 900 also includes, responsive to determining that measurement data for the primary power bus fails to satisfy a power criterion, actuating a switch of the power transfer unit to cause the power transfer unit to receive power from a secondary power bus, at 916. For example, referring to FIG. 1, the controller 106 actuates the switch 152 to cause the power transfer unit 102 to receive power from the secondary alternating current power bus 122 in response to the measurement data 176 indicating that the voltage level of the primary alternating current power bus 120 fails to satisfy a voltage threshold indicated by the power criterion.

The method 900 also includes, responsive to determining that updated measurement data for the primary power bus satisfies the power criterion, causing the power transfer unit to switch back to receiving power from the primary power bus or from a tertiary current power bus in response to a determination that a charge state of the energy buffer satisfies a charge state threshold, at 918. For example, after actuating the switch 152 of the power transfer unit 102 to cause the power transfer unit 102 to receive power from the secondary alternating current power bus 122, the method 900 includes determining whether a charge state of the energy buffer 118 satisfies the charge state threshold. Determining whether the charge state of the energy buffer 118 satisfies the charge state threshold can also be responsive to determining that updated measurement data 176 for the primary alternating current power bus 120 satisfies the power criterion. In response to a determination that the charge state of the energy buffer satisfies the charge state threshold, the method 900 includes actuating the switch 152 of the power transfer unit 102 to receive power from the primary alternating current power bus 120.

The method 900 enables the power supply to the flight test system 108 to remain uninterrupted while the switch 152 switches between different power terminals 140-142. For example, the energy buffer 118 stores power that is extracted to power the flight test system 108 during bus transferring (e.g., while the switch 152 couples the power transfer unit output terminal 154 to a different power bus 120-124). The system 100 also enables automatic power bus switching according to power availability. For example, the switch 152 connects different power busses 120-124 to the power transfer unit output terminal 154 based on the measurement data 176-178 indicating power states of the power busses 120-124, respectively. Additionally, converting signals to direct current signals and then to alternating current signals reduces a load un-balance of power associated with an aircraft system.

Figure 10:
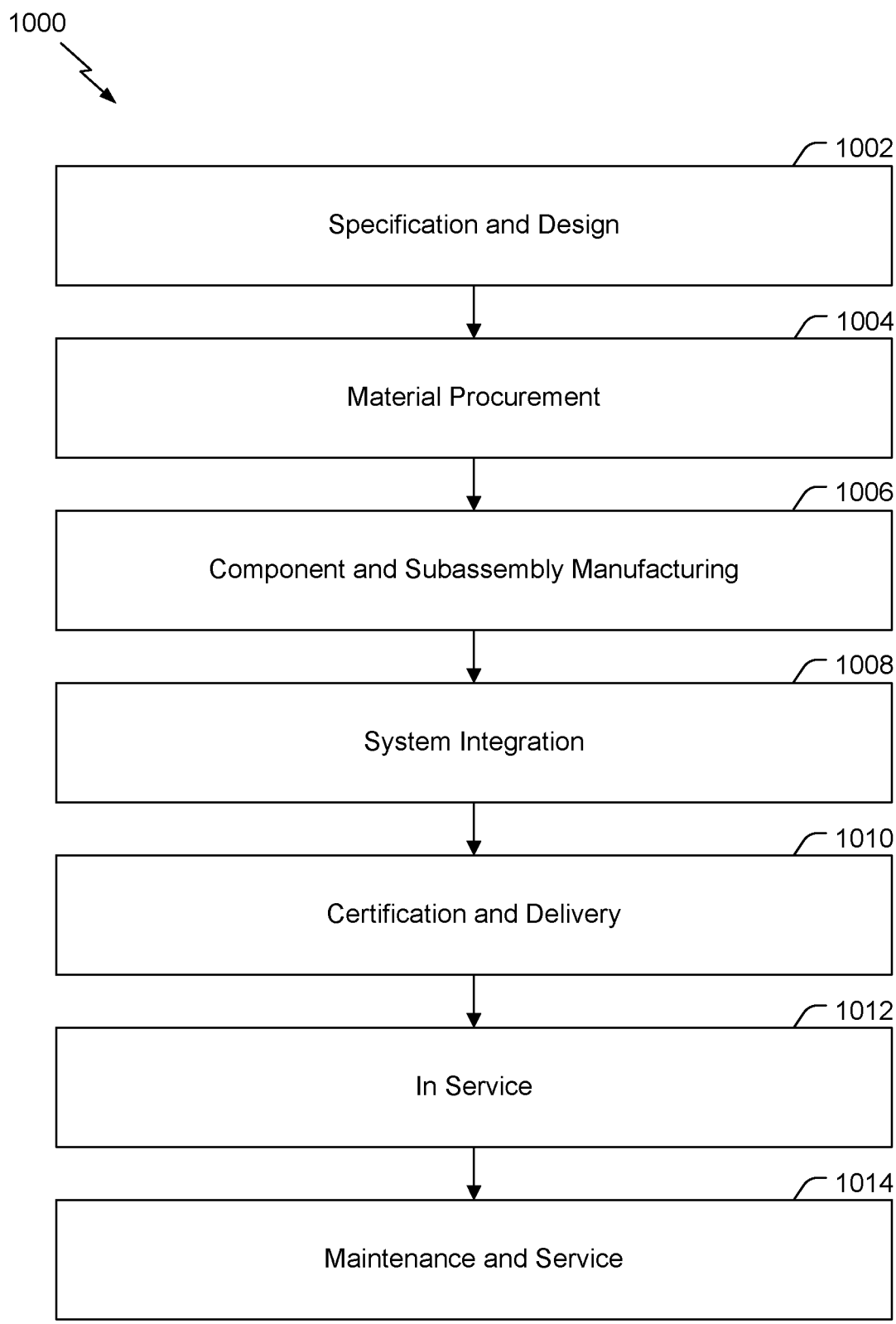
FIG. 10 is a flowchart of a method associated with the development and maintenance of a system to power a flight test system during flight testing of an aircraft.

Referring to FIG. 10, examples of the disclosure are described in the context of an aircraft design, manufacturing, and service. FIG. 10 shows a flowchart illustrative of a method 1000 associated with the system 100. During pre-production, the method 1000 includes, at 1002, specification and design of the system 100. For example, the specification and design of a device for powering a flight test system 100. At 1004, the method 1000 includes material procurement. For example, the method 1000 includes procuring materials (such as materials for different components of the system 100) for the aircraft.

During production, the method 1000 includes, at 1006, component and subassembly manufacturing and, at 1008, system integration of the aircraft. The method 1000 may include component and subassembly manufacturing of the system 100. At 1010, the method 1000 includes certification and delivery of the aircraft and, at 1012, placing the aircraft in service. In some implementations, certification and delivery includes certifying the system 100. Placing the aircraft in service may also include placing the system 100 in service. While in service, the aircraft may be scheduled for routine maintenance and service (which may also include modification, reconfiguration, refurbishment, and so on). At 1014, the method 1000 includes performing maintenance and service on the aircraft. The method 1000 may include performing maintenance and service on the system 100. For example, maintenance and service of the system 100 can include replacing the voltage sources 144-146, the energy buffer 118, other components of the system 100, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A power control system comprising:
 a power transfer unit, wherein the power transfer unit comprises a power transfer unit output terminal and one or more switches coupled to the power transfer unit output terminal, and wherein the one or more switches are configured to selectively couple the power transfer unit output terminal to a power terminal;
 a power conditioning unit coupled to the power transfer unit output terminal, wherein the power conditioning unit comprises:
  a rectifier having an input terminal coupled to the power transfer unit output terminal;
  a regulator having an input terminal coupled to an output terminal of the rectifier;
  an energy buffer coupled to an output terminal of the regulator; and an inverter having an input terminal coupled to the energy buffer and having an output terminal configured to couple to a load; and a controller coupled to the power transfer unit via one or more switch control lines and coupled to the power conditioning unit via one or more regulator control lines.

2. The power control system of claim 1, further comprising an energy buffer sensor coupled to the energy buffer and configured to provide a signal indicating a charge state of the energy buffer to the controller, wherein the controller is configured to control operation of the one or more switches based at least in part on the signal indicating the charge state of the energy buffer.

3. The power control system of claim 2, wherein the controller is configured to:
compare the charge state of the energy buffer to a charge state threshold; and
cause the power transfer unit to switch to receiving power from a primary power bus in response to a determination that the charge state of the energy buffer satisfies the charge state threshold, wherein the primary power bus comprises a first power bus of a plurality of alternating current power busses or a second power bus of a plurality of direct current power busses.

4. The power control system of claim 1, wherein the controller comprises a flight control system port configured to receive one or more signals from a flight control system of an aircraft, wherein the controller is configured to control operation of the power transfer unit, the power conditioning unit, or both, responsive to the one or more signals, and wherein at least one signal of the one or more signals comprises an emergency stop signal.

5. The power control system of claim 1, wherein the energy buffer comprises a capacitor, an ultra-capacitor, a battery, or a flywheel.

6. The power control system of claim 1, wherein the rectifier comprises a multi-phase rectifier circuit configured to convert an alternating current signal to a direct current signal, and wherein the inverter comprises a multi-phase inverter circuit configured to covert a direct current signal to an alternating current signal.

7. A power control system comprising:
a power transfer unit configured to receive power via a current signal from a primary power bus, wherein the primary power bus is associated with one of a plurality of alternating current power busses or a plurality of direct current power busses of an aircraft;
a conditioning unit coupled to the power transfer unit and configured to:
receive the current signal from the power transfer unit;
rectify the current signal to generate a rectified signal in response to the current signal corresponding to an alternating current signal from one of the plurality of alternating current power busses or bypass rectification operations in response to the current signal corresponding to a direct current signal from one of the plurality of direct current power busses;
store energy of the rectified signal or energy of the direct current signal at an energy buffer of the conditioning unit;
generate a conditioned alternating current signal based on the rectified signal or the direct current signal; and
output the conditioned alternating current signal to an output terminal configured to be coupled to a load of a flight test system;
a controller configured to:
receive measurement data for each alternating current power bus of the plurality of alternating current power busses and measurement data for each direct current power bus of the plurality of direct current power busses; and
responsive to determining that measurement data for the primary power bus fails to satisfy a power criterion, actuate a switch of the power transfer unit to cause the power transfer unit to receive power from a secondary power bus.

8. The power control system of claim 7, wherein the controller is further configured to, responsive to determining that measurement data for the secondary power bus fails to satisfy the power criterion, actuate the switch of the power transfer unit to cause the power transfer unit to receive power from a tertiary current power bus.

9. The power control system of claim 7, wherein, during a switching time of the power transfer unit, the conditioning unit is further configured to:
extract first energy from the energy buffer; and
generate, based on the first energy, the conditioned alternating current signal output to the output terminal.

10. The power control system of claim 7, wherein:
a first alternating current power bus of the plurality of alternating current power busses is associated with a first set of voltage and frequency characteristics;
a second alternating current power bus of the plurality of alternating current power busses is associated with a second set of voltage and frequency characteristics, wherein the second set of voltage and frequency characteristics differ from the first set of voltage and frequency characteristics; and
the conditioned alternating current signal is associated with a third set of voltage and frequency characteristics, wherein the third set of voltage and frequency characteristics are independent of whether the first alternating current power bus, the second alternating current power bus, or a direct current power bus of the plurality of direct current power busses is selected via the power transfer unit.

11. The power control system of claim 7, wherein the plurality of alternating current power busses and the plurality of direct current power busses include power busses of an aircraft under flight test and the load comprises a test equipment system.

12. The power control system of claim 7, wherein the energy buffer is sized to maintain the conditioned alternating current signal provided to the load for a period of time during switching of the power transfer unit between two power busses.

13. The power control system of claim 7, wherein the measurement data for each alternating current power bus indicates at least one of a voltage level of a corresponding alternating current power bus, a harmonic distortion of a corresponding alternating current power bus, or a frequency variation of a corresponding alternating current power bus, and wherein the measurement data for each direct current power bus indicates at least one of a voltage level of a corresponding direct current power bus, or a voltage fluctuation of a corresponding direct current power bus.

14. The power control system of claim 7, wherein the controller comprises an input interface configured to receive a user input assigning a priority to each power bus and indicating bus selection rules.

15. The power control system of claim 7, wherein the controller comprises a regulator control circuit configured to generate a control signal provided to a regulator of the conditioning unit, and wherein the regulator is responsive to the control signal to control a voltage level of the rectified signal or a voltage level of the direct current signal.

16. The power control system of claim 7, wherein the controller comprises an inverter control circuit configured to generate a control signal provided to an inverter of the conditioning unit, and wherein the inverter is responsive to the control signal to control voltage and frequency characteristics of the conditioned alternating current signal.

17. The power control system of claim 7, wherein the controller is further configured to:
   receive updated measurement data for the primary power bus while the power transfer unit is receiving power from the secondary power bus;
   responsive to determining that the updated measurement data satisfies the power criterion, determine whether a charge state of the energy buffer satisfies a charge state threshold; and
   cause the power transfer unit to switch to receiving power from the primary power bus in response to a determination that the charge state of the energy buffer satisfies the charge state threshold.

18. A method of powering a flight test system during flight testing of an aircraft, the method comprising:
   selecting, at a power transfer unit, to receive power via a current signal from a primary power bus, the primary power bus selected from one of a plurality of alternating current power busses or a plurality of direct current power busses of an aircraft;
   receiving, at a conditioning unit, the current signal from the power transfer unit based on the selection;
   rectifying, at the conditioning unit, the current signal to generate a rectified signal in response to the current signal corresponding to an alternating current signal from one of the plurality of alternating current power busses, wherein rectification operations are bypassed in response to the current signal corresponding to a direct current signal from one of the plurality of direct current power busses;
   storing energy of the rectified signal at an energy buffer of the conditioning unit;
   generating a conditioned alternating current signal based on the rectified signal;
   outputting the conditioned alternating current signal to an output terminal that is coupled to a load of a flight test system;
   receiving, at a controller, measurement data for each alternating current power bus and measurement data for each direct current power bus of the plurality of direct current power busses; and
   responsive to determining that measurement data for the primary power bus fails to satisfy a power criterion, actuating a switch of the power transfer unit to cause the power transfer unit to receive power from a secondary power bus.

19. The method of claim 18, further comprising during switching from the primary power bus to the secondary power bus, outputting the conditioned alternating current signal using energy stored at the energy buffer.

20. The method of claim 18, further comprising, after actuating the switch of the power transfer unit to cause the power transfer unit to receive power from the secondary power bus:
   responsive to determining that updated measurement data for the primary power bus satisfies the power criterion, determining whether a charge state of the energy buffer satisfies a charge state threshold; and
   in response to a determination that the charge state of the energy buffer satisfies the charge state threshold, actuating the switch of the power transfer unit to cause the power transfer unit to receive power from the primary power bus.

* * * * *